United States Patent [19]
Williams

[11] Patent Number: 5,920,062
[45] Date of Patent: Jul. 6, 1999

[54] COMBINED LINEAR AND TWO-DIMENSIONAL BAR CODE STRUCTURE

[75] Inventor: Theodore C. Williams, Acton, Mass.

[73] Assignee: Uniform Code Council, Inc., Dayton, Ohio

[21] Appl. No.: 08/843,075

[22] Filed: Apr. 30, 1997

[51] Int. Cl.[6] .................................................. G06K 19/06
[52] U.S. Cl. .............. 235/494; 235/462.08; 235/462.09; 235/462.1
[58] Field of Search .............................. 235/494, 462.08, 235/462.09, 462.1

[56] References Cited

U.S. PATENT DOCUMENTS

| | | | |
|---|---|---|---|
| 5,304,787 | 4/1994 | Wang | 235/462 |
| 5,357,094 | 10/1994 | Baldwin | 235/462.1 |
| 5,446,791 | 8/1995 | Wooley et al. | 381/118 |
| 5,490,217 | 2/1996 | Wang et al. | 380/51 |
| 5,572,010 | 11/1996 | Petrie | 235/494 |
| 5,600,119 | 2/1997 | Dvorkis et al. | 235/462.1 |
| 5,627,900 | 5/1997 | Wooley et al. | 381/118 |
| 5,726,435 | 3/1998 | Hara et al. | 235/462.1 |
| 5,773,806 | 6/1998 | Longacre, Jr. | 235/462.1 |

OTHER PUBLICATIONS

IDS Feb '99, Deb Navas, "New Marking Options for Electronics", pp. 30–41.

*Primary Examiner*—Donald Hajec
*Assistant Examiner*—Douglas X. Rodriguez
*Attorney, Agent, or Firm*—Iandiorio & Teska

[57] ABSTRACT

A combined linear and two-dimensional bar code structure containing encoding information therein. There is a linear bar code structure portion including a series of bars and spaces each bar and space made up of at least one module. There is also a two-dimensional bar code structure portion located adjacent to the top or bottom of the linear bar code portion. The two-dimensional bar code structure portion has a plurality of elements wherein each element has a predefined relationship with the modules of the linear bar code structure portion for determining the placement of the two-dimensional bar code structure elements. The predefined relationship may include making each element's width equal to the width of the modules of the linear bar code structure portion and aligning each element of the two-dimensional bar code structure with a module.

17 Claims, 2 Drawing Sheets

COMBINED LINEAR AND TWO-DIMENSIONAL BAR CODE STRUCTURE

FIELD OF INVENTION

This invention relates to a combined linear and two-dimensional bar rode structure.

BACKGROUND OF INVENTION

The bar code structures described in this specification typically contain encoded information in a patterned format and are variously referred to as "non-volatile electro-optical read-only memories comprising symbols printed or otherwise inscribed on a substrate", "bar code symbologies", "machine readable data file structures including code words", "machine readable symbols", or simply "bar code labels".

There are two types of bar code structures: linear and two-dimensional. Linear bar code structures include constant width strips called modules. Each data element (e.g., a number or letter) is made up of a plurality of bars and spaces each of which is made up of one or more constant width modules of the same color. A scanner then "reads" the sequencing and width of the bars and spaces to decode the data.

Two-dimensional bar code structures, on the other hand, are made up of a two-dimensional array of individual square or rectangular light or dark elements. Thus, a "T" shaped symbol may denote one number while an "L" shaped symbol may denote a different number or letter.

The advantage of two-dimensional bar code structures over linear one dimensional bar code structures is their ability to store significantly more information. The disadvantage of two-dimensional bar code structures is that they require a "finder pattern" to allow the scanner to recognize each individual symbol area and to distinguish a symbol from other markings, an orientation pattern to allow the scanner to determine the physical orientation of each symbol, and a horizontal position reference pattern which allows the scanner to determine the location of each element so it can sample its state, light or dark.

This requirement of a finder pattern, an orientation pattern, and a horizontal position reference pattern results in significant "overhead" which has a detrimental impact on the goal of two-dimensional bar code structures, namely to provide a high capacity and high density symbology. In other words, the finder pattern, the orientation pattern, and the horizontal reference pattern take up a significant amount of space on the bar code label thus detracting from the anticipated higher capacity and higher density symbology.

SUMMARY OF INVENTION

It is therefore an object of this invention to provide a combined linear and two-dimensional bar code structure.

It is a further object of this invention to provide such a combined linear and two-dimensional bar code structure which does not have the overhead associated with the finder, orientation, and horizontal position reference patterns required in prior art two-dimensional bar code structures.

It is a further object of this invention to provide such a combined linear and two-dimensional bar code structure which is compatible with existing scanners including linear scanners.

It is a further object of this invention to provide such a combined linear and two-dimensional bar code structure which is compatible with existing bar code structures such as the EAN/UPC or UCC/EAN bar codes.

This invention results from the realization that in many cases where primary product information data is encoded in a linear bar code structure and supplemental product information data is encoded in a two-dimensional bar code structure, the linear bar code structure itself can be used as a finder pattern, orientation pattern, and horizontal reference pattern for the two-dimensional bar code structure thus eliminating the significant overhead associated with prior art two-dimensional bar code structure designs and resulting in an integral, high capacity, high density bar code structure.

This invention features a combined linear and two-dimensional bar code structure containing encoding information therein. There is a linear bar code structure portion including a series of bars and spaces, each bar and space comprising at least one module. There is also a two-dimensional bar code structure portion located adjacent to the top or bottom of the linear bar code portion. The two-dimensional bar code structure portion has a, plurality of elements wherein each element has a predefined relationship with the modules of the linear bar code structure portion for determining the placement of the two-dimensional bar code structure elements.

In the preferred embodiment, the predefined relationship includes making each element's width equal to the width of the modules of the linear bar code structure portion and aligning each element of the two-dimensional bar code structure portion with a module.

For increasing the vertical resolution, each element has a height which is one and one half to three times larger than the width of the element.

The two-dimensional bar code structure portion preferably includes a vertical reference distance identifier pattern such as three sets of opposing contrast elements, each set including two opposing contrast elements, each opposing set being of opposite polarity. The first set is typically located above the first module of the linear bar code structure portion, the second set is typically located above the middle module of the linear bar code structure portion, and the third set is typically located above the last module of the linear bar code structure portion.

DISCLOSURE OF PREFERRED EMBODIMENT

Other objects, features and advantages will occur to those skilled in the art from the following description of a preferred embodiment and the accompanying drawings, in which.

Figure 1:
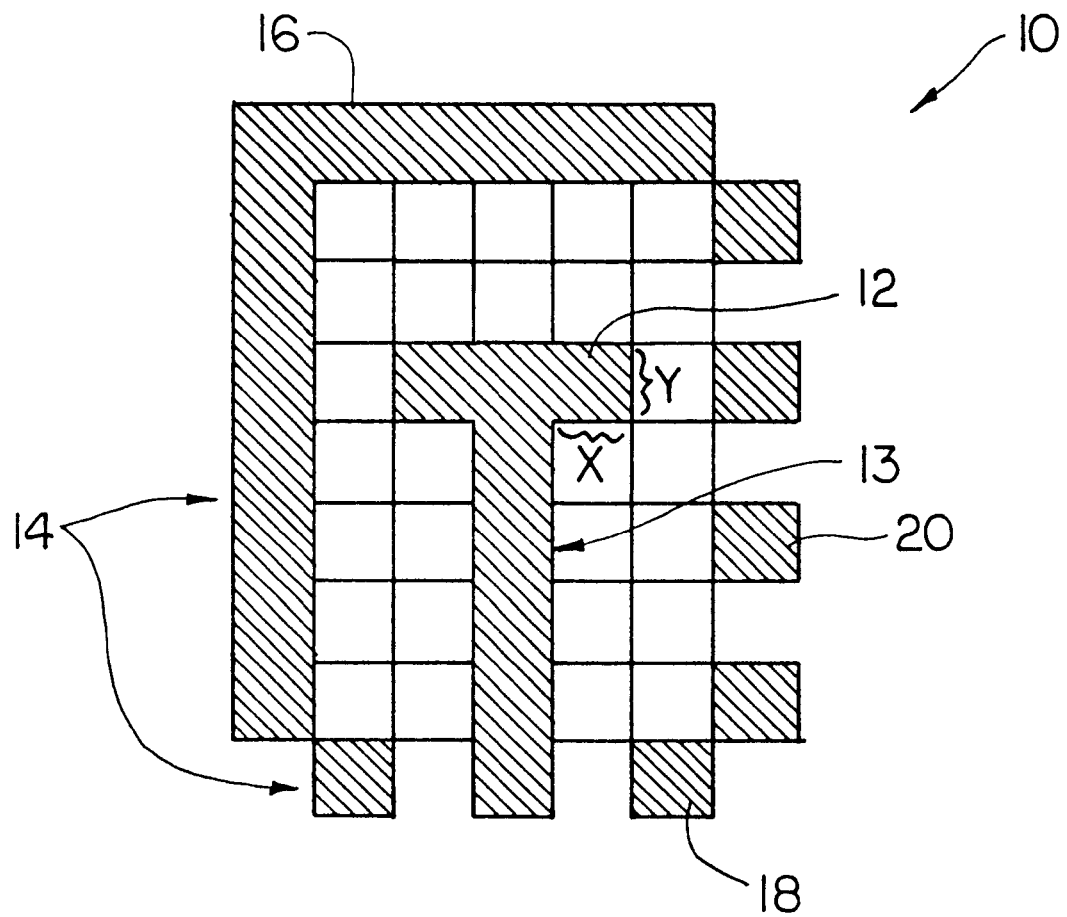
FIG. 1 is a top view of a prior art two-dimensional bar code structure and its associated finder pattern.

Prior art two-dimensional bar codes include symbol area 10, FIG. 1, made up of typically two hundred and twenty individual square or rectangular elements such as element 12. Each element has a predefined width x and a predefined height y as shown for element 12. Element 12 is dark and the pattern formed by the other dark elements form the "T" shaped symbol 13 shown in FIG. 1 within symbol area 10.

In order for the bar code scanner to distinguish symbol 13 from other markings, to determine the physical orientation of each symbol, and to determine the location of each element of symbol 13 so it can sample its light or dark state, finder pattern 14 is required. Finder pattern 14 includes "L" shaped region 16 which allows the scanner to recognize symbol 13 as a two-dimensional bar code symbol and to determine the physical orientation of symbol 13. Elements 18 and 20 allow the bar code scanner to determine the physical location of each individual element of symbol 13 (such as element 12) so the bar code scanner can properly sample the state of each individual element making up symbol 13.

As discussed in the Background of Invention above, finder pattern 14 takes up a significant amount of space thus defeating the goal of a high capacity, high density symbology.

In accordance with this invention, however, finder pattern 14 is not required. Instead, the combined linear and two-dimensional bar code structure of this invention includes linear bar code structure portion 30, FIG. 2A, including a series of bars such as bars 32 and 34, and spaces such as space 36 and space 38. Linear bar code structure 30 may be a UPC-A bar code containing twelve digits of information to identify a particular product. Bar 34 is one module wide and therefore the smallest width bar possible. Bar 32, on the other hand, is several modules in width. The same is true for the difference in width between space 38 and space 36.

Figures 2A, 2B:
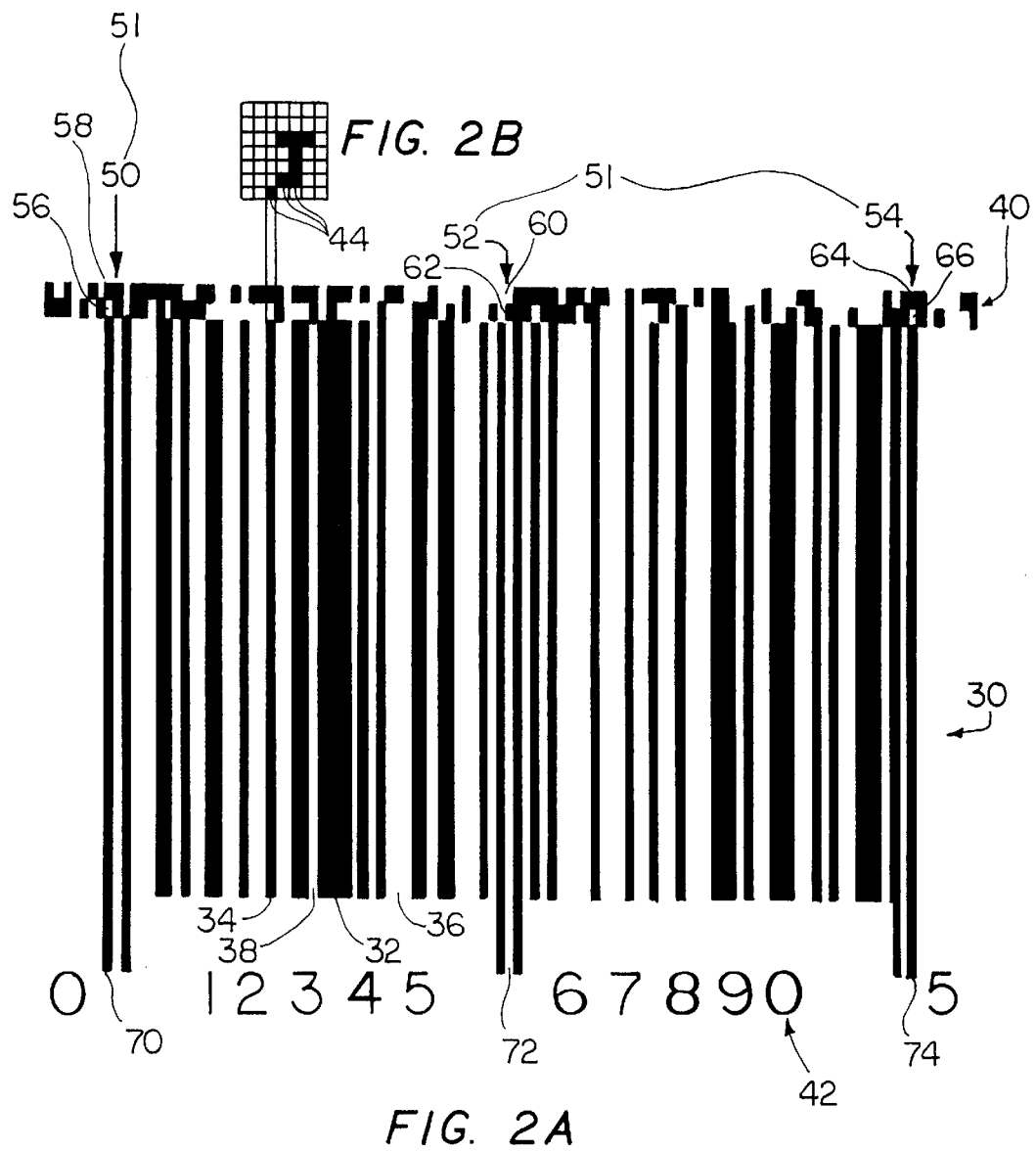
FIG. 2A is a top view of the combined linear and two-dimensional bar code structure of this invention.
FIG. 2B is a top view of one particular two-dimensional bar code symbol area of the two-dimensional bar code structure portion of the combined bar code structure shown in FIG. 2A.

In this invention, two-dimensional bar code structure portion 40 is located on the top or bottom of linear bar code portion 30 but preferably at the top as shown in FIG. 2A so it does not interfere with the human readable data located at the bottom as shown at 42. Two-dimensional bar code structure 40 can typically encode up to thirty eight digits and/or control characters. It contains one hundred thirty six bits of data, seventy two bits of error correction, four bits of format data, and six bits used in three vertical reference patterns making up a vertical reference distance identifier pattern 51 discussed in more detail below. Two-dimensional bar code structure 40 has two rows but could have as many as sixteen rows.

In order to correctly orient and locate each element such as element 44, FIG. 2B, of the individual symbols making up two-dimensional bar code structure portion 40, FIG. 2A, each element 44 has a predefined relationship with the modules of linear bar code structure portion 30.

In the preferred embodiment, there is a relationship between each element 44 of two-dimensional bar code structure portion 40 and the modules of linear bar code structure portion 30. Each element, such as element 44 of two dimensional bar code structure portion 40 has a width equal to the width of a module of linear bar code structure portion 30 and is directly aligned with a module. Thus, each data element of two-dimensional bar code structure portion 40 has a width which is the same as the width of each individual module of linear bar code structure 30 and each element is aligned on top of a module of linear bar code structure portion 40. This allows the scanner to determine the center of an element 44 to sample its black or white state or, in other words, provides a horizontal reference distance.

Each data element 44 of two-dimensional bar code structure portion 40 also preferably has a height which is greater than its width for increasing the vertical resolution of the two-dimensional bar code structure. Thus, each element preferably has a height of one and one half to three times its width.

In this way, the only overhead associated with the combined linear and two-dimensional bar code structure of this invention is linear bar code structure portion 30 (which is present in most cases anyway) and some type of a vertical reference distance identifier pattern 51. In the preferred embodiment, pattern 51 includes sets of opposing contrast elements such as set 50, set 52, and set 54. Each set includes opposing contrast elements such as elements 56 and 58 of set 50, elements 60 and 62 of set 52, and elements 64 and 66 of set 54. Preferably, first set 50 is located above first module 70 of linear bar code structure portion 30, set 52 is located above middle module 72, and set 54 is located above last module 74. Each adjacent set is of opposite polarity as shown. Thus, set 50 includes dark element 58 on top of light element 56, while set 52 includes light element 60 on top of dark element 62. This vertical reference distance identifier pattern provides the scanner with a vertical reference distance for two-dimensional bar code structure portion 40.

The scanner is able to recognize each individual symbol area of the two dimensional structure portion 40 by programming it to read information above the linear bar code structure portion 30. The orientation of the two-dimensional bar code structure and the horizontal reference position is fixed because each element is the same width as a module and is aligned with the top of a module of the linear bar code structure portion. In this way, the combined linear and two-dimensional bar code structure of this invention does not have the overhead associated with the prior art finder, orientation, and horizontal position reference patterns, is compatible with existing scanners, and is compatible with existing bar code structures.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A combined linear and two-dimensional bar code structure containing encoding information therein comprising:

a linear bar code structure portion including a series of bars and spaces each bar and space comprising at least one module; and a two-dimensional bar code structure portion located adjacent to the top or bottom of the linear bar code portion, said two-dimensional bar code structure portion comprising:

a plurality of elements wherein each element has a predefined relationship with the modules of the linear bar code structure portion for determining the placement of the two-dimensional bar code structure elements.

2. The combined linear and two-dimensional bar code structure of claim 1 in which the predefined relationship includes each element having a width equal to the width of the modules of the linear bar code structure portion and each element of the two-dimensional bar code structure portion being aligned with a said module.

3. The combined linear and two-dimensional bar code structure of claim 2 in which each element has a height which is n times larger than the width of the element for increasing the vertical resolution of the two-dimensional bar code structure portion.

4. The combined linear and two-dimensional bar code structure of claim 3 in which n=2.

5. The combined linear and two-dimensional bar code structure of claim 3 in which n=3.

6. The combined linear and two-dimensional bar code structure of claim 1 in which said two-dimensional bar code structure portion further includes a vertical reference distance identifier pattern.

7. The combined linear and two-dimensional bar code structure of claim 6 in which said vertical reference distance identifier pattern includes at least one set of opposing contrast elements.

8. The combined linear and two-dimensional bar code structure of claim 7 in which there are two opposing contrast elements in each set.

9. The combined linear and two-dimensional bar code structure of claim 7 in which there are m sets of opposing contrast elements, each set located above a module of the linear bar code structure, each adjacent set being of opposite polarity.

10. The combined linear and two-dimensional bar code structure of claim 9 in which m=3 and the first set is located above the first module of the linear bar code structure portion, the second set is located above the middle module of the linear bar code structure portion, and the third set is located above the last module of the linear bar code structure portion.

11. A combined linear and two-dimensional bar code structure containing encoded information therein comprising:

a linear bar code structure portion including a series of bars and spaces each comprising at least one module; and a two-dimensional bar code structure portion located adjacent to the linear bar code portion, said two-dimensional bar code structure portion comprising:
a plurality of elements wherein each element has a width equal to the width of a module and each element is aligned with a module for determining the placement of the two-dimensional bar code structure elements.

12. A combined linear and two-dimensional bar code structure containing encoded information therein comprising:

a linear bar code structure portion including a series of bars and spaces each comprising at least one module; and a two-dimensional bar code structure portion located adjacent to the linear bar code portion, said two-dimensional bar code structure portion comprising:
a plurality of elements wherein each element has a predefined relationship with the modules of the linear bar code structure portion for determining a placement of the two-dimensional bar code structure elements, and
a vertical reference distance identifier pattern.

13. The combined linear and two-dimensional bar code structure of claim 12 in which the predefined relationship includes each element having a width equal to the width of the modules of the linear bar code structure portion, each element of the two-dimensional bar code structure portion being aligned with a said module.

14. The combined linear and two-dimensional bar code structure of claim 12 in which said vertical reference distance identifier pattern includes at least one set of opposing contrast elements.

15. The combined linear and two-dimensional bar code structure of claim 14 in which there are two opposing contrast elements in each set.

16. The combined linear and two-dimensional bar code structure of claim 14 in which there are m sets of opposing contrast elements, each set located above a module of the linear bar code structure, each adjacent set being of opposite polarity.

17. The combined linear and two-dimensional bar code structure of claim 16 in which m=3 and the first set is located above the first module of the linear bar code structure portion, the second set is located above the middle module of the linear bar code structure portion, and the third set is located above the last module of the linear bar code structure portion.

* * * * *